(12) United States Patent
Shi

(10) Patent No.: US 8,439,260 B2
(45) Date of Patent: May 14, 2013

(54) REAL-TIME BARCODE RECOGNITION USING GENERAL CAMERAS

(76) Inventor: Jiazheng Shi, Scottsdale, AZ (US)

( * ) Notice: Subject to any disclaimer, the term of this patent is extended or adjusted under 35 U.S.C. 154(b) by 0 days.

(21) Appl. No.: 13/317,307

(22) Filed: Oct. 15, 2011

(65) Prior Publication Data

US 2012/0091204 A1    Apr. 19, 2012

Related U.S. Application Data

(60) Provisional application No. 61/455,284, filed on Oct. 18, 2010.

(51) Int. Cl.
*G06K 5/00*    (2006.01)

(52) U.S. Cl.
USPC .......................................................... 235/437

(58) Field of Classification Search ................. 235/437, 235/462.04, 462.06
See application file for complete search history.

(56) References Cited

U.S. PATENT DOCUMENTS

2012/0018518 A1* 1/2012 Strom et al. ............. 235/462.04

OTHER PUBLICATIONS

"Blind deconvolution of bar code signals" by Selim Esedoglu, Nov. 21, 2003, Institute of Physics Publishing, Inverse Problems 20 (2004) pp. 121-135.*

* cited by examiner

*Primary Examiner* — Daniel Hess

(57) ABSTRACT

A method, apparatus, and system for decoding and recognizing barcode information by using a general camera such as one in a mobile device is disclosed. The invention uses a set of compact point spread functions (PSF) with a squared-shape distribution to restore blurred barcode image for quick and efficient decoding and recognition. Image pre-processing methods are applied to reduce noise and normalize pixel grayscale. On each normalized image, the invention checks if the image contains barcode lines. If there is a barcode, the invention tries to identify the beginning and ending positions of the barcode. The invention selectively decodes multiple scan lines across the barcode and match against predefined barcode models. The best matched barcodes are saved in the history buffer.

15 Claims, 4 Drawing Sheets

REAL-TIME BARCODE RECOGNITION USING GENERAL CAMERAS

CROSS REFERENCE TO RELATED APPLICATIONS

This utility patent application claims priority to provisional patent application Ser. No. 61/455,284 filed Oct. 18, 2010 and entitled "Real-time Barcode Recognition Using General Cameras in Mobile Devices." Provisional patent application Ser. No. 61/455,284 is hereby incorporated by reference in its entirety.

FIELD OF INVENTION

This invention relates to image recognition in general, and more particularly to barcode recognition.

BACKGROUND OF THE INVENTION

Barcode is a machine-recognizable visual identification of products. It encodes numerical digits and/or alphabetic letters into images. Barcode has been widely used in many applications, such as product checkout in retail stores and product tracking during shipping services. Barcode was designed originally for recognition by using special handheld devices. These devices emit energy to highlight barcode for accurate and fast recognition. This method is called active barcode recognition. Active barcode recognition has great impact on product flow. Recently, as mobile devices such as smartphones having integrated cameras are getting more and more popular, software applications have been implemented to recognize barcodes from images acquired by the integrated cameras. Because such method does not direct any energy, it is called passive barcode recognition. Passive barcode recognition on mobile devices provides useful applications because: (1) mobile devices have flexible internet access through wireless connection (e.g., 3G or WiFi) and (2) phone cameras can be utilized without extra cost for hardware. Other features (e.g., user location information) with mobile devices can also help to boost commercial applications, such as comparison shopping, gift registration, wedding registration, and so on.

In terms of image patterns, barcodes can be grouped into one-dimensional ("1D") barcodes or two-dimensional ("2D") barcodes. A 1D barcode image is composed by a series of parallel lines (bars). Line width and spacing encode numerical digits to identify product. Instead of bars, 2D barcodes use other symbols, such as dots and squares. The most popular barcodes in the market are 1D Universal Product Code (UPC) and 1D European Article Number (EAN). UPC encodes 12 numerical digits. It is popular in North American. EAN encodes 13 digits and popular in Europe, Japan, and other countries. Without mentioning further, the term "barcode" includes at least UPC and EAN.

Traditional passive barcode recognition methods have limited applications in practice because they require strict imaging environment in order to recognize barcode accurately and quickly. Among these requirements, phone cameras must have autofocus function, barcodes must be printed on even surface, and a handhold camera must remain steady during scanning. This invention provides an innovative method to recognize UPC and EAN quickly and accurately without the above restrictions or requirements. In other words, this invention is capable of quickly and accurately recognizing blurry barcode images. In addition, this invention performs greatly in decoding irregular barcodes, including barcodes printed on rounded surfaces, barcode on uneven surface, etc. Finally, human hands tend to shake in the practice of scanning barcodes. Rather than requiring users to hold cameras steadily, this invention exploits the shaking of handheld cameras to improve the performance of barcode recognition.

Power efficiency is significant in mobile applications due to limited battery capacity of mobile devices. This invention reduces the amount of battery power required to perform the recognition process because of its compact software design and efficient utilization of every single picture while avoiding redundant image information. If the video frame rate is appropriately controlled (e.g., 10 frames/second), successive images from a video sequence typically are not strongly correlated. This invention tries to decode every single image from a video sequence, even though some images are blurred due to camera out-of-focus. First, energy used to mechanically adjust the lens can be reduced. Second, energy used to capture images can be minimized. Third, this invention can recognize barcode on low-resolution images, so it minimizes the energy that would be consumed by high-resolution imaging. Fourth, this invention selectively decodes 1D scan lines across the bars within each image, because the successive scan lines are strongly correlated (on an ideal barcode image, all scan lines are the same.) In summary, this invention minimizes the usage of redundant information and maximizes the usage of independent information to speed up decoding process and improve decoding accuracy, which also saves the energy consumption.

SUMMARY OF THE INVENTION

In one embodiment of the present invention, a method and apparatus for image restoration of blurred barcode is disclosed. The claimed invention uses a set of compact point spread functions (PSF) with a squared-shape distribution. These PSFs can be adjusted to approximately represent the response of a wide range of cameras in mobile devices to a point object. They can recover barcode signals that are blurred due to camera out-of-focus. Its low computational cost is well-suited to applications in mobile devices which have limited computational resource and battery capacity. The claimed invention provides a new metric that measures the degree of image restoration during iteration process. The measurement computes the statistics of absolute values of derivatives of 1D barcode signal. Again, the metric has very low computational cost.

In another embodiment of the present invention, a method and apparatus for recognizing barcodes on uneven package surfaces is disclosed. The claimed invention provides piecewise matching of barcode models and real signal with a flexible search range. The adjustable matching overcomes barcode distortion. The claimed invention further provides computationally efficient metric that measures the similarity between a piece of real barcode signal and each of pre-built digit models. The L1 norm is used to reduce computational cost and achieve good measurement of similarity.

In another embodiment of the present invention, a method and apparatus for recognizing barcodes on round-shaped package surfaces is disclosed. The claimed invention provides a mathematical model that corrects distortion of barcode images projected onto round shaped surfaces. The method estimates the relationship of 3D scene and its projection on 2D image plane. The invention provides a method that decides whether surface correction is required. The surface correction method is activated when the mean contrast of the 1D signal is above a predefined threshold.

In another embodiment of the present invention, a method and apparatus for recognizing barcode in situations, where camera position is unstable, is disclosed. The claimed invention provides a design that account for unstable camera positions. Cameras in handheld devices are unstable in most applications. When a camera is moving, it is difficult to focus on barcode objects and so the quality of barcode images is undermined. This invention designs multiple imaging models to restore blurry barcode images. This invention also designs a queue structure that efficiently buffers recognition history from the different models. The results are evaluated collectively to achieve the best barcode match. Since the algorithm is able to process data even on blurry images in real-time, it is unnecessary to require users to hold a mobile device steadily during scanning. This invention provides a design that takes advantage of unstable camera positions. If a camera remains steady, images of a video sequence within a short interval have high redundancy. Moving camera, however, can provide independent images and speed up decoding. This invention explores this feature.

Yet in another embodiment of the present invention, energy efficiency is achieved. This invention tries to decode every single image from a video sequence, even though some images are blurred due to camera out-of-focus. The invention is designed to recognize barcodes on low quality images, so it minimizes barcode imaging energy. This invention analyzes each single image by selecting most irrelevant barcode scan lines in order to improve recognition accuracy and speed, and so to minimize power consumption. It selects only a limited number of scan lines from each image in the interleaving pattern. Neighboring scan lines typically contain similar information for recognition. In other words, they are highly redundant. Decoding redundant information wastes computational resource and battery power, degrades accuracy, and increase decoding time.

This invention further provides sensitivity and specificity design. For example, in one embodiment of the present invention, the disclosed method and/or apparatus provides a "double decode" design to improve specificity. For each 1D scan line, the algorithm decodes it from left to right and then from right to left. In this fashion, each scan line can be utilized twice. The two results from different directions of decoding provide an effective way to validate the barcodes. The two barcodes must be the same regardless of decoding directions.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the leftmost digit of a reference number identifies the drawing in which the reference number first appears.

DETAILED DESCRIPTION

Figure 1:
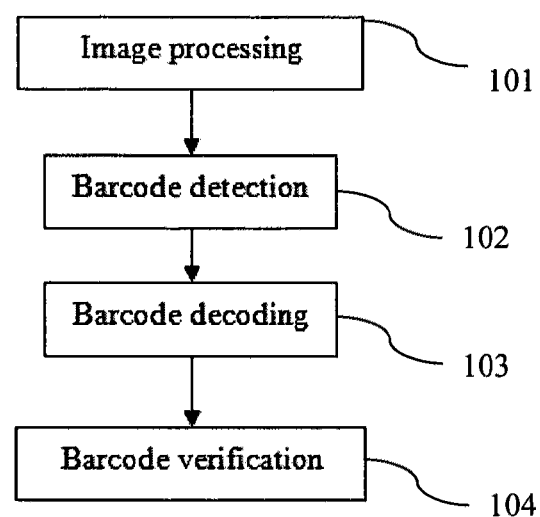
FIG. 1 is a block diagram showing the major components of the barcode recognition system, in accordance with one embodiment of the present invention.

FIG. 1 shows the major components of the barcode recognition system. The system first reads either a still image or image frames from video sequences. Image pre-processing methods are applied by the image processing component 101 to reduce noise and normalize pixel grayscale. On each normalized image, the barcode detection component 102 checks if the image contains barcode lines. If there is a barcode, the barcode detection component 102 tries to identify the beginning and ending positions of the barcode. The tailored barcode region is passed to the barcode decoding component 103, which selectively decodes multiple scan lines across the barcode and match against predefined barcode models. The best matched barcodes are saved in the history buffer. The barcode verification component 104 ensures that the method achieve the highest recognition sensitivity while maintaining the lowest false recognition rate.

Figure 2:
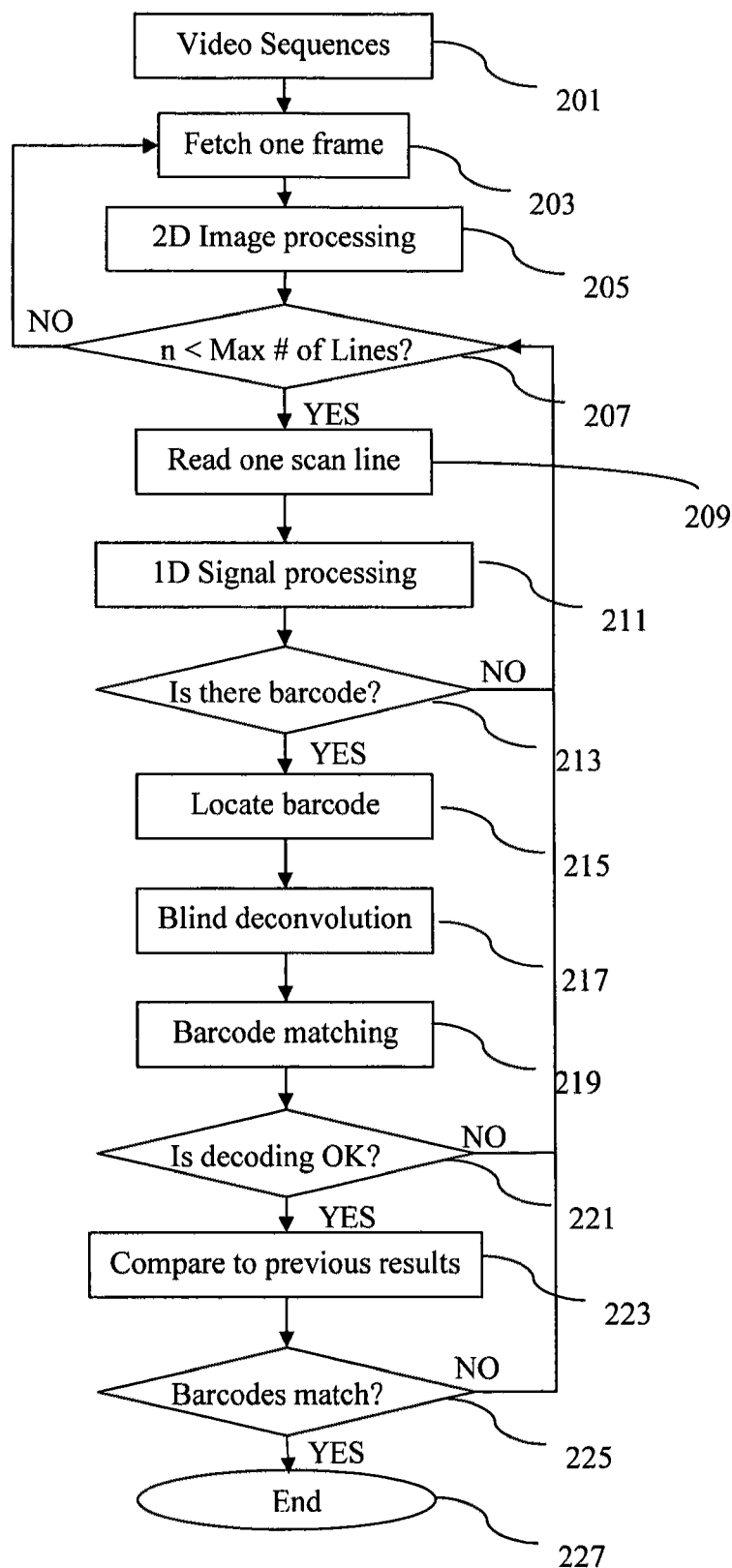
FIG. 2 is a flow diagram of the barcode recognition system, in accordance with one embodiment of the present invention.

FIG. 2 shows a flow diagram of the barcode recognition system in accordance to one embodiment of the invention. The system incorporates multiple stages. They are designed to have the good trade-off between the sensitivity and specificity.

At block 201, a sequence of video frames are captured and decoded into 2D images in the real-time mode. To reduce computational cost in the following image processing and recognition steps and to improve energy efficiency, images are downsampled appropriately (e.g., AVCaptureSessionPresetMedium for Apple's iPhone 3Gs), if only good sensitivity of barcode recognition can be maintained. Because ideal barcodes are literally black and white symbols, all color images acquired from a mobile camera are converted to grayscale images. The sequence of grayscale images are buffered, typically in a queue data structure. Due to the limited capacity of the buffer, old images can be skipped.

At block 203, the most recent image is selected for decoding, e.g., dequeuing the top image from the buffer.

At block 205, the selected image is cropped in terms of the viewfinder rectangle shown on the mobile screen. It is suggested that the cropped image cover the whole barcode for best recognition accuracy and fastest speed, but this invention can recognize partially covered barcode if complete barcode lines in the horizontal direction are available. The gray scale of the cropped image is normalized, e.g., the grayscale is limited in [0, 1]. The normalized image is partitioned into parallel 1D scan lines in the horizontal direction.

At block 207, the number of scan lines from the same image that has been decoded is compared with its preset maximum value. If the maximum number is reached, the image is marked as decoding complete. Otherwise, a new scan line is selected.

At block 209, one new scan line is selected from the image. Because continuous scan lines are strongly correlated or redundant in terms of the barcode design specification, not every line is needed for recognition in order to reduce the computational cost and thus save energy consumption in mobile devices. One approach is to decode scan lines in the interleaving fashion, e.g., decode one scan line and then skip the next 3 lines.

At block 211, the 1D scan line is processed using efficient signal processing algorithms in order to achieve the best signal quality. Signal noise is attenuated using digital filters. Grayscale is equalized to compensate the impact of uneven illumination that happens frequently in many scanning environments. This invention proposes a linear illumination model which performs well in most illumination environment.

A barcode contains many strips of black bars and white spaces, and it has significant edge information. The edge information remains prominent with acquired barcode images though they might degrade due to camera out of focusing (e.g., the barcode image shown in FIG. 3). At block 213, the processed scan line is processed to determine whether it contains barcode information. If the processed line has edge information above a predefined threshold, it is considered as containing barcode information and will be decoded furthermore. Otherwise, it is discarded.

At block 215, once a scan line is identified with barcode information, the starting and ending points of the barcode are located, for example, by detecting identifiable guards, e.g., sufficient large quite zone on both sides of barcode symbols UPC-A barcode.

Figure 4:
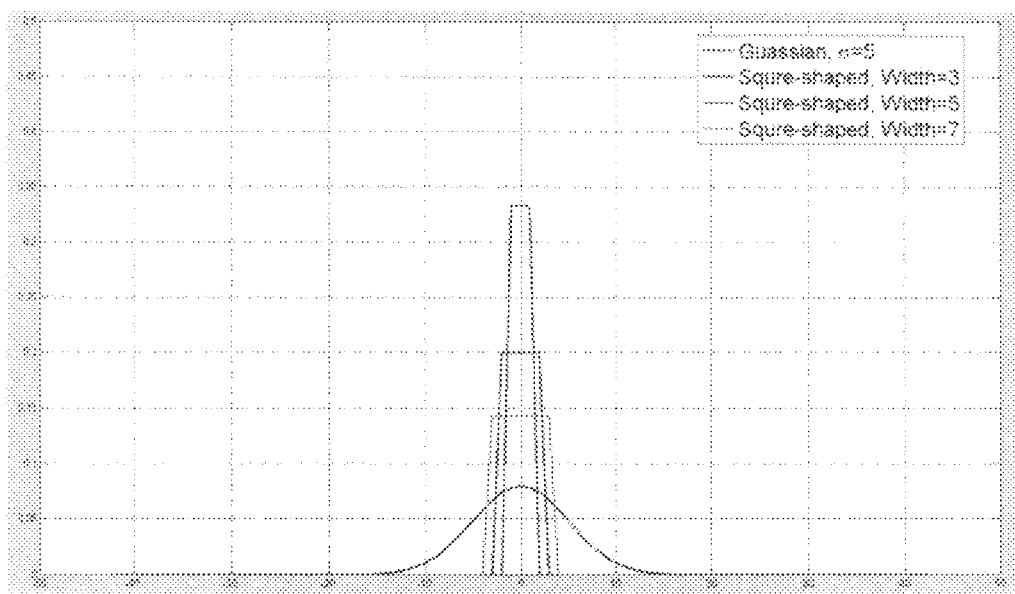
FIG. 4 shows the Gaussian PSF (with the standard deviation of 5 pixels) which has long-tail response and a group of compact square-shaped PSFs with various response widths (3, 5, 7 pixels), in accordance with one embodiment of the present invention.

At block 217, a blind deconvolution method is used to restore the barcode information based on the compact square-shaped PSFs process shown in FIG. 4. The process iteratively improves the barcode information while minimizing the residual error between the captured signal and restored signal.

At block 219, the restored barcode is matched against a predefined barcode model created according to a given barcode standard, to obtain the best estimate of the barcode. The number of models depends on the barcode type, e.g., both UPC-A and EAN 13 have 10 models corresponding to each digit from 0-9.

At block 221, the decoded barcode is verified based on the checksum information defined in the barcode standard. The checksum indicates whether the recognized code is valid or not. If valid, it is saved in a pool.

At block 223, the valid barcode is compared to all previously recognized barcodes saved in the pool. Consecutively decoded barcodes are saved and checked to verify if they are the same. The comparison is implemented with an efficient computational algorithm, e.g., direct memory comparison.

At block 225, the process checks if the barcode is identical to any previous one in the pool. If there is a match, recognition stops. Otherwise, the process tries the next scan line.

Image Processing

The barcode symbols are typically small. To reduce computational cost, save power consumption, and improve recognition accuracy, only the image region under a viewfinder is cropped for processing. The viewfinder has appropriate size for best user interface experience.

Standard barcode is a sequence of binary codes of 0 or 1. Color channel information in images captured by phone camera is redundant. According to one embodiment of this invention, colored images are converted into grayscale images. For example, the effective luminance of a pixel can be formulated as:

$$Grayscale=0.3*Red+0.59*Green+0.11*Blue$$

The recognition algorithm in this invention is not limited to this formula. Some cameras might require special corrections.

The grayscale region is further normalized to be in the range of [0, 1]. The normalization of image ensures that the algorithm can work for a wide range of environment lighting. For example, normalization removes background light and help the recognition algorithm perform well when operating under dim light. Normalization improves computational efficiency due to simplified software implementation during the rest of recognition components. Normalizing images helps to extend this invention to work on more general video formats from various mobile devices.

Barcode Detection

The normalized region within the viewfinder is passed to the barcode detection component. Ideally, each 1D scan line of a barcode image provides sufficient information for decoding. This invention improves the decoding accuracy while minimizing the processing of redundant information. Barcode detection is applied only on a limited number of lines on each image.

For each pixel on the line, both horizontal gradient $G_x$ and vertical gradient $G_y$ are computed. The specification of barcode indicates that $G_x=1$ and $G_y=0$ on perfect image. In practice, however, typically $G_x \leq 1$ and $G_y \geq 0$ due to various reasons, such as poor image quality, partial-pixel effect, or rotation of imperfect alignment between the camera and the barcode on packages. This invention computes the gradient index $G^i$ for the pixel i:

$$G^i = abs(G_x^i - G_y^i)$$

where $G^i$ combines two measures to enhance the contrast.

To determine if a line is from a barcode region, the invention computes the statistics of $G^i$. In accordance with an embodiment of the invention, the process further applies computational efficient low pass filter to reduce the noise level of $G^i$. Moving average, but not limited to, is filter that performs well while maintain low computational cost. The mean value $G=E\{LP(G^i)\}$ of $G^i$ is used to determine if the line contains barcode. If G is above a predefined threshold, the line is defined as potential barcode line.

The final step is to search the beginning and ending points of the barcode bi-directionally starting from the center of the line. The assumption that the center must be in the barcode is held typically. The viewfinder also provides a method for users to impose this assumption. The beginning b and ending e points are defined when $G^i$ is below a predefined threshold.

Barcode Decoding

Equal Brightness

According to one embodiment, this invention is designed to recognize barcodes in various illumination environments and product packages. Glaring and shadow may distort the distribution of grayscale along a scan line. This invention equals the brightness by linear fitting based on the two ending points of a barcode. The guard bars should have the same grayscale distribution as specified. The corrected brightness $T_i$ at pixel i is formulated as:

$$T_i = T_b + i*(T_e - T_b)/\text{width} \quad i \epsilon [b, e]$$

where $T_b$ and $T_e$ are the original brightness at the beginning and ending points, and width=e−b+1 is the total number of pixels.

Interpolation

The barcodes printed on package has various sizes and the camera has various object distances. Barcode images thus have different dimensions. According to one embodiment, this invention improves the portability of the algorithm by interpolating images to a uniform size. Interpolation also simplifies the implementation of the decoding algorithm. The algorithm in this invention can recognizes barcode which has only one pixel.

Surface Correction

Many barcodes are printed on round-surfaced packages. Ideally, all bars should have the same line width. Video cameras, however, project 3D objects onto a 2D image plane, so the rounded surface distorts the bar width. Bars on both sides typically are far away to the lens and so are expanded while bars in the middle are closer to the lens and so are condensed. According to one embodiment, this invention corrects this distortion based on rounded math model. The bar width is adjusted to improve recognition accuracy.

Model Fitting

Each numerical digit in barcode is represented with predefined pattern of bars. For example, each digit of UPC-A has 7 bars and has at most 3 consecutive bars of spaces. According to one embodiment, this invention dynamically builds 1D digit model based on the barcode specification. The grayscale of real barcode signal is normalized to [0, 1]. The high and low grayscales of the model are averaged from the normalized barcode signal. The matching process proceeds in a piecewise manner for each barcode digit. Let M be the number of pixels of a digit model and c be the aligned common center of the model and the real signal of the digit. The model is matched against the real barcode signal with the search range of [c−N, c+N] pixels. Mathematically, the model fitting can be defined as:

$$\text{diff}(i, d) = \sum_{m=1}^{M} |\text{Model}(d, m) - \text{Signal}(c + m + i)|$$

$$i \in [-N, N]$$

$$d \in \{0, 1, 2, 3, 4, 5, 6, 7, 8, 9\}$$

Minimizing the difference $$\{\tilde{i}, \tilde{d}\} = \underset{i,d}{\text{argmin}}\, \text{diff}(i, d)$$

yields the best matching at location $\tilde{i}$ and the best mach digit is $\tilde{d}$.

A large N might be good for recognizing barcodes on uneven surface, but may decrease recognition specificity and computational cost.

Blind Deconvolution

Figure 3:
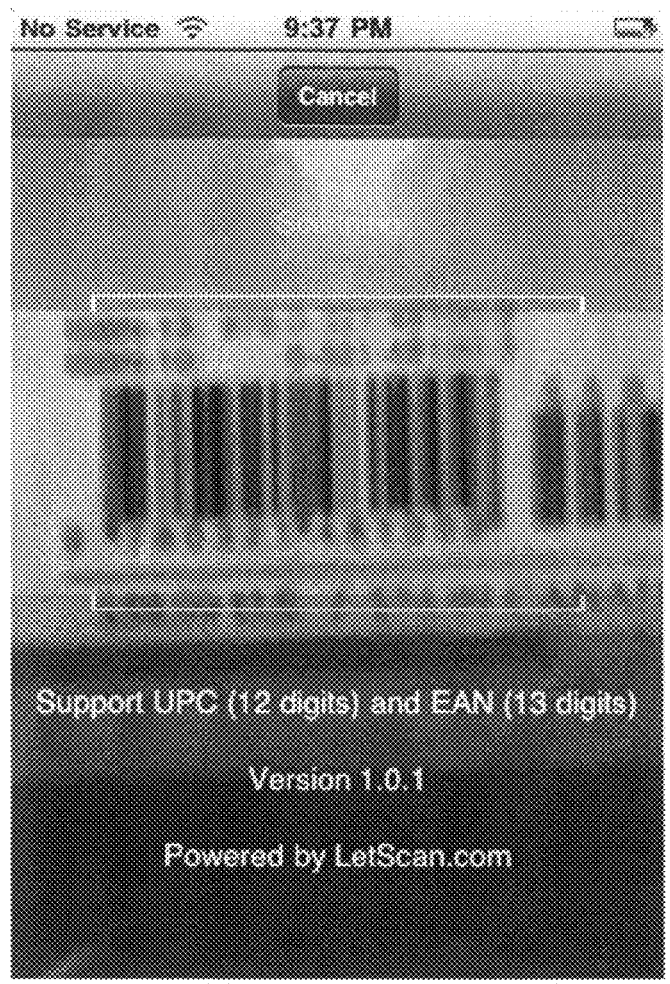
FIG. 3 shows an example of a blurred barcode image acquired by an iPhone 3G applying the barcode recognition system, in accordance with one embodiment of the present invention.

During barcode imaging, the camera lens is adjusted for best image quality. Barcode recognition is a real-time process. For best user experience, barcode recognition should be accomplished as fast as possible. One practical concern is that many cameras in mobile devices do not have autofocus function or have low resolution because manufacturers try to reduce manufacturing cost or for other reasons. Because barcodes are small objects, barcode image acquired by non-autofocus cameras are blurry in many scenarios. FIG. 3 shows an example of a blurred barcode image acquired by an iPhone 3G. The blurred barcode can not be decoded directly without image restoration.

There are many image restoration methods in the literature: linear and nonlinear methods. Most assume that the blurring model is known as a prior. In practice, however, the imaging model typically is unknown. Blind deconvoclution is an efficient tool to restore image quality without the precise knowledge of imaging system.

Even for high-end mobile devices that have auto-focus cameras, blind deconvolution can significantly improve the barcode decoding speed and accuracy. First, the recognition can be accomplished during autofocusing. Second, autofocus image may still fail due to incorrect targeting position. In these cases, blind deconvolution can restore image quality furthermore to improve the user experience.

Blind deconvolution is an advanced image restoration method that can recover original scene from one or multiple degraded images with limited or even without knowledge of the point spread function (PSF) of an imaging system. The PSF can be estimated from degraded images dynamically or based on predefined models. The dynamic estimation is more adaptive in theory, but computationally more expensive. The predefined empirical models are more computationally efficient but the estimation is less accurate. For real-time barcode recognition, this invention considers both good recognition accuracy and low computational cost methods. Multiple predefined models are evaluated for each image because it may have different degradation as users move or shake cameras. The blind deconvolution process is terminated based on barcode verification.

There are many PSF models in the literatures. The most popular one is the Gaussian function, which has good spatial and frequency domain properties. However, the Gaussian kernel has very long tail (infinite in theory), so its computational cost is high. There are a few publications that evaluated the blind deconvolution of barcodes based on the Gaussian kernel and reported poor recognition speed.

This invention introduces computationally more efficient model. Our model is defined by squared-shape PSF in 1D spatial domain. Numerically, the size of PSF can be odd number 2n+1, in order to avoid phase distortion of barcode signal. FIG. 4 shows the Gaussian PSF (with the standard deviation of 5 pixels) which has long-tail response and a group of compact square-shaped PSFs with various response widths (3, 5, 7 pixels). The compact response has low computational cost if they are implemented in spatial domain, so they are more adequate for mobile computation.

Barcode Verification

Barcode specification defines a checksum method to check the validity of barcodes. For example, UPC-A and EAN use the last digit as an error correcting check digit, which is designed to detect errors in automatic scanning or manual entry. Verification defined in barcode specification is insufficient to guarantee high specificity of barcode recognition. In particular, the passive barcode recognition that analyze low-quality images acquired by mobile devices without using specifically designed hardware require more sophisticated verification methods.

According to one embodiment, this invention achieves high recognition specificity by fusing multiple verification methods. They are also tuned to maintain high recognition sensitivity. First, the traditional low-cost checksum method is applied. Second, for each preprocessed line across the barcode, the barcode decoding process is applied twice: from left to right and then from right to left. A necessary condition for a successful decoding is that the left-to-right decoding result must be the same as that of the right-to-left decoding. We call this design "double-decode". For each scan line, if its barcode passes the verifications of checksum and "double-decode", it is saved in the barcode history. Third, the recognition specificity is improved furthermore by comparing barcodes from multiple scan lines. The final barcode is returned only when there are N identical barcodes consecutively saved in the history. The number N must be tuned for trade-offs between specificity and sensitivity.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

I claim:

1. A method for barcode recognition comprising:
   receiving a sequence of images captured by a camera,
   detecting whether the sequence of images contain barcode information,
   calculating a first barcode result based on a first image of said sequence of images by applying a blind deconvolution method with a square-shaped point spread function,
   verifying the first barcode result with checksum information, and
   comparing the first barcode result with a second barcode result previously calculated based on a second image of said sequence of images and said square-shaped point spread function to determine whether the first barcode result matches the second barcode result.

2. The method of claim 1, wherein the blind deconvolution method is applied with a plurality of square-shaped point spread functions.

3. The method of claim 1 further comprising equalizing a grayscale of a scan line of one of the said sequence of images to improve signal quality.

4. The method of claim 3, wherein said equalizing step comprises equalizing brightness by linear fitting based on ending points of a barcode.

5. The method of claim 1 further comprising interpolating said sequence of images to a specified size.

6. The method of claim 1 further comprising correcting surface irregularity by applying a rounded math model.

7. A method for recognizing barcode information comprising:
   receiving a sequence of images captured by a camera of a mobile device,
   selecting interleaving scan lines from the sequence of images for decoding,
   equalizing a grayscale of the selected scan lines to reduce an effect caused by uneven illumination,
   detecting whether a first scan line from the selected interleaving scan lines includes barcode information,
   applying a blind deconvolution method with a square-shaped point spread function on said first scan line to decode a barcode result, and
   comparing the barcode result with a previously decoded barcode result calculated based on a second scan line from said selected interleaving scan lines and said square-shaped point spread function.

8. The method of claim 7 further comprising determining a location associated with the barcode information.

9. The method of claim 8, wherein said equalizing step comprises equalizing brightness by linear fitting based on ending points of a barcode.

10. The method of claim 9 further comprising interpolating said sequence of images to a specified size.

11. A mobile device comprising:
    a camera for capturing a sequence of images,
    a memory for storing instructions, and
    a processor which, upon executing the instructions, performs a process comprising
       detecting whether the sequence of images contain barcode information,
       calculating a first barcode result by applying a blind deconvolution method with a first square-shaped point spread function on a first image of said sequence of images,
       calculating a second barcode result by applying a blind deconvolution method with a second square-shaped point spread function on a second image of said sequence of images, and
       comparing the first barcode result with the second barcode result to determine whether the first barcode result matches the second barcode result.

12. The mobile device of claim 11, wherein the process further comprising equalizing a grayscale of a scan line of one of the said sequence of images to improve signal quality.

13. The mobile device of claim 12, wherein said equalizing step comprises equalizing brightness by linear fitting based on ending points of a barcode.

14. The mobile device of claim 11, wherein the process further comprising interpolating said sequence of images to a specified size.

15. The mobile device of claim 11, wherein the process further comprising correcting surface irregularity by applying a rounded math model.

* * * * *